United States Patent [19]

Overman

[11] 4,260,573

[45] Apr. 7, 1981

[54] METHOD FOR PELLETIZING WOOD PARTICULATE MATTER

[76] Inventor: Kenneth Overman, Rte. 2, Box 407, Liberty, N.C. 27298

[21] Appl. No.: 119,522

[22] Filed: Feb. 7, 1980

[51] Int. Cl.³ .............................................. B29C 19/02

[52] U.S. Cl. ...................................... 264/68; 264/118; 264/124; 264/141; 264/145

[58] Field of Search ................. 264/118, 68, 124, 141, 264/145

[56] References Cited

U.S. PATENT DOCUMENTS

| | | | |
|---|---|---|---|
| 2,590,757 | 3/1952 | Cornelius, Jr. et al. | 264/124 |
| 2,867,843 | 1/1959 | Brown et al. | 264/118 |
| 3,493,527 | 2/1970 | Schueler | 264/109 |
| 3,779,686 | 12/1973 | Kertrula et al. | 264/109 |
| 4,086,316 | 4/1978 | Ahrweiler et al. | 264/120 |

*Primary Examiner*—Donald E. Czaja
*Assistant Examiner*—James R. Hall
*Attorney, Agent, or Firm*—Roy B. Moffitt

[57] ABSTRACT

A method and apparatus for forming pellets from wood particulate material: The apparatus comprises one or more parallel aligned, elongated dies formed by first and second aligned and mating continuous belts comprising a plurality of pads linked together. At least one of the belts has pads that contains a plurality of parallel longitudinal grooves in their free surface and the pads of the other belt are confrontingly aligned with the free surface of the pads of the first-mentioned continuous belt, to form the elongated dies. The wood particulate material, containing from 12 to 20% water, is cut, compacted, extruded and autogenously heated in the elongated dies by simultaneously rotating one of the belts counterclockwise and the other belt clockwise at respectively rotational speeds such that the linear speed of one of the belts is greater than the linear speed of the other.

9 Claims, 15 Drawing Figures

METHOD FOR PELLETIZING WOOD PARTICULATE MATTER

BACKGROUND

Throughout the world, particularly in the southeastern United States, there are forest areas that contain locations having the remnants of either past or present sawmill activity. Almost without exception, such locations contain huge concentrations of wood particulate material in the form of sawdust. For all practical purposes, this material is left to rot, its vast storehouse of energy wasted, all because there is no available technology that can cheaply pelletize (compact and densify) the otherwise loose sawdust into cohesive units that can withstand shipment to distant points, storage and ultimate feeding into a combustion chamber. Technology of the type desired contemplates apparatus that can either be stationary or transportable from location to location, wherever the sawdust piles may be found.

Basic to any commercially feasible pelletization operation is that the energy consumed to do the pelletizing, transportation and storage must be much less than the potential combustion energy derived from burning the wood pellets. Most conventional pelletization methods and apparatus presently available require that the wood material be heated during pelletization, using an outside source of heat, so as to render plastic the natural resins in the wood particles. Alternatively, binder materials are added, already heated to a plastic state. Upon cooling, the natural resins or binder material, whichever the case may be, forms a cohesive film that binds one wood particle to another within a pellet. Without an added binder or the activation of the wood's natural resins to a plastic state, wood particles do not satisfactorily adhere or cohere to one another; thus a fragile pellet is formed, not cohesively capable of retaining its shape during subsequent transportation, storage and feeding into a combustion chamber.

DESCRIPTION OF THE PRIOR ART

A high degree of compaction (densification) and pellet toughness (a pellet's resistance to disintegration) are the desired attributes of a commercial wood pellet. The greatest amount of wood matter per unit volume corresponds to a greater amount of BTUs per unit volume. All pelletizing apparatus are designed to achieve, to some degree, these desired properties. All prior art pelletizers, known to applicant, attempt to extrude wood particulate matter through a die of relative short barrel length, having no moving or movable parts. In such equipment, the wood particles are exposed to the compacting, shaping and densification forces in the barrel for only a short time. Contrary to this common practice, applicant employs an elongated die having moving parts, the die itself being composed of aligned longitudinal grooves in the face of individual pads, linked together to form a continuous belt. Such a belt is used in confronting alignment with another belt, both belts being constructed similar to and driven by the well known mechanism of the common bulldozer.

Some investigators interested in wood pelletization have used elongated belts in combination with heat from an outside source to achieve compaction and densification of carbonaceous particulate matter. As early as 1892, U.S. Pat. No. 474,412 to Schmidt addressed itself to the continuous production of fuel-bricks. This disclosure dealt not with wood particulate matter but with coal dust mixed with a binder, such a mixture being fed between converging belts and compacted into briquettes that were ultimately transported and burned. In 1940, U.S. Pat. No. 2,194,593 issued to Graham, which addressed itself to a machine for compacting and densifying sawdust into briquettes for consumption in heating apparatus. Graham recognized the well-known principle that wood sawdust contains sufficient natural resins, pitch and the like, that could be used for particle binding purposes, if enough heat and pressure are applied to activate them, i.e. render them plastic. Graham attempted to solve the problem of cost related to forming wood particulate matter using a conventional cavity mold and simultaneously applying heat and pressure, by employing a method and apparatus that was basically continuous in nature. He used a continuous belt in combination with a plurality of steam-heated rolls, the belt being heated by means of chambered tables through which steam was allowed to flow. Co-action of the heated rollers and the continuous belt was enough to activate the natural resins of the wood particles and thus cause the wood particles to adhere one to another, creating a cohesive mass suitable for subsequent transport, storage and feeding into a combustion chamber. Addition of external heat to the wood particulate matter while it was being briquetted is essential to the Graham teaching. However, the cylindrical nature of the heated rolls limited the area over which simultaneous application of roll pressure and heat was achieved during the compacting process.

SUMMARY OF THE INVENTION

The instant invention employs none of the concepts of the prior art to achieve a desired degree of wood particle compaction. Desirable wood particle compaction and adhesion is achieved by use of an elongated die through which the wood particulate material is extruded, the die being composed of two moving parts, one of the parts moving faster than the other. The two parts of the elongated die are basically two continuous confronting mating belts, each belt being composed of a plurality of pads movably linked together in a fashion to form a continuous flite or belt. At least one of the belts contains a plurality of longitudinal grooves in the free surface of its pads. The free surface of the other continuous belt is confrontingly aligned with the free surface of the first-mentioned continuous belt to form the elongated dies and may or may not also have aligned grooves. The wood particulate material is fed into the dies while simultaneously rotating one of the belts counterclockwise and the second belt clockwise at respective rotational speeds such that the linear speed of one of the belts is greater than the linear speed of the other belt. This co-action of the differential speeds of the two belts cuts, compacts, extrudes (forces the wood particles through the entire length of the die formed by the pads of the two continuous belts) and autogenously heats the wood particles in the elongated dies.

In one embodiment of the invention, the first continuous belt is disposed above a second continuous belt and is in confronting mating alignment with it and is composed of a series of linked metal pads forming a continuous belt or flite rotatable in a predetermined direction. The metal pads of the first belt contains a plurality of parallel aligned grooves in its free outermost surface. When the metal pads of the first continuous belt are in confronting alignment with the metal pads of the second, an elongated moving die is created. The pads forming the top portion of the die (first continuous belt) move faster than the pads forming the bottom portion of the die (second continuous belt). The counterclockwise rotation of the first continuous belt in co-action with the clockwise motion of the second continuous belt forces wood particular material entering the converging rotating portion (the "nip") of these belts into a die or dies formed by the grooves of the first belt and the mating portions of the metal pads of the second belt. Because the first belt moves at a faster linear speed than the second belt, friction is developed and the particulate material is extruded through the die or dies. It is the friction (heat) plus the co-action of the first and second belts producing pressure on the wood particles that renders plastic the natural resins and pitch in the wood particles thus causing the wood particles to adhere to one another. The elongated nature of the die or dies, for example 7.5 feet, through which the wood particulate material is forced (extruded), results in a highly compacted and dense pellet. Alternatively, the second continuous belt could be rotated faster than the first continuous belt and the pads of either one or both of the first and/or second continuous belt may have aligned grooves therein to form a die and/or dies of an elongated nature. It is immaterial which construction is used or which belt is rotated faster than the other or whether pads of either one or both of the first and second continuous belts contain grooves, all embodiments being equally operable.

DESCRIPTION OF THE PREFERRED EMBODIMENT

The exemplary method described in this disclosure are adapted particularly for the production of wood pellets which may have various and sundry lengths, depending upon the length of the particular pad itself. It will be understood that the following description is not addressed to the scope of the invention of the method described, as it may take a variety of forms.

Figure 1:
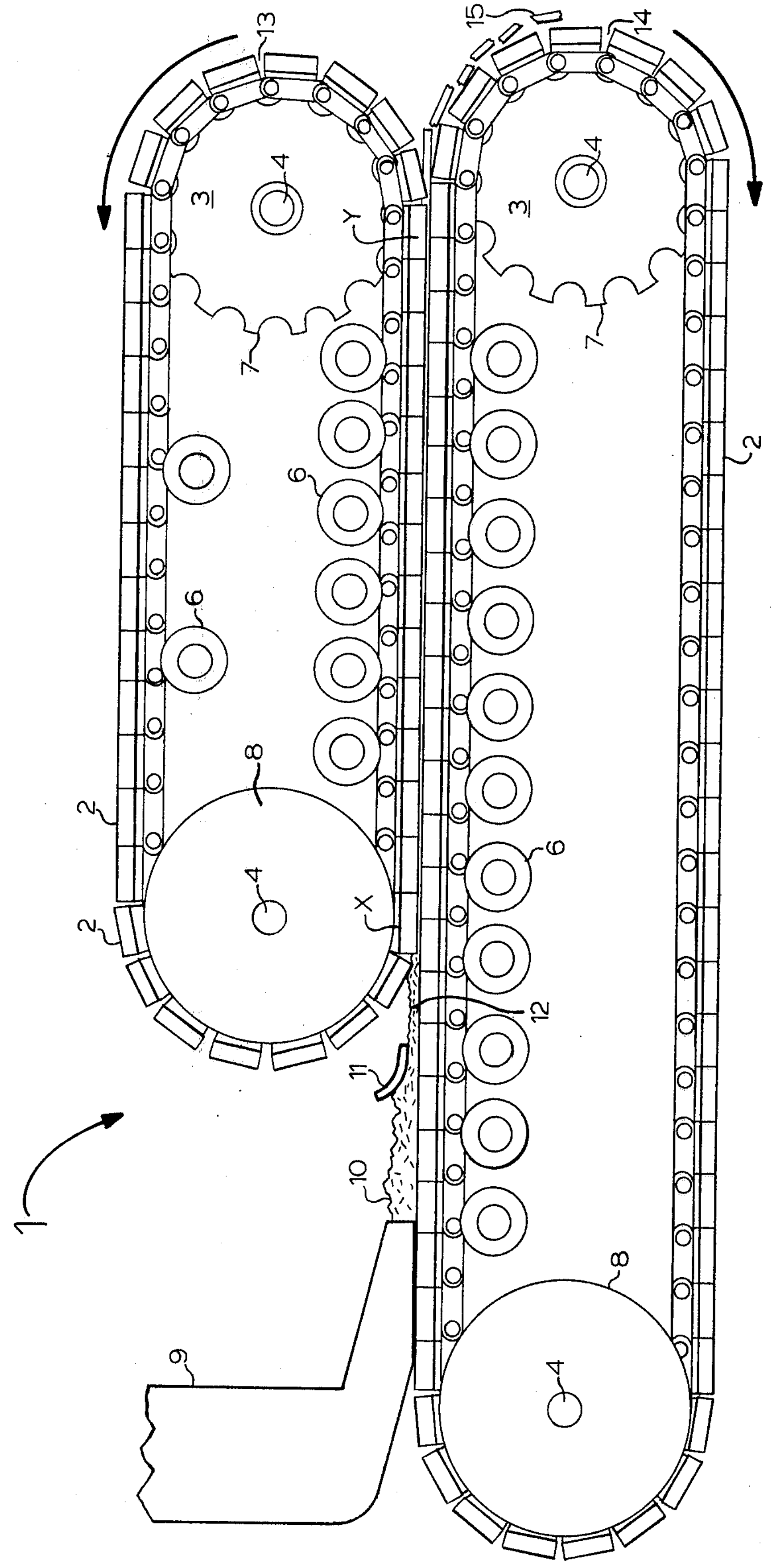
FIG. 1 is a side elevation of the apparatus constructed in accordance with this invention.
Figure 6:
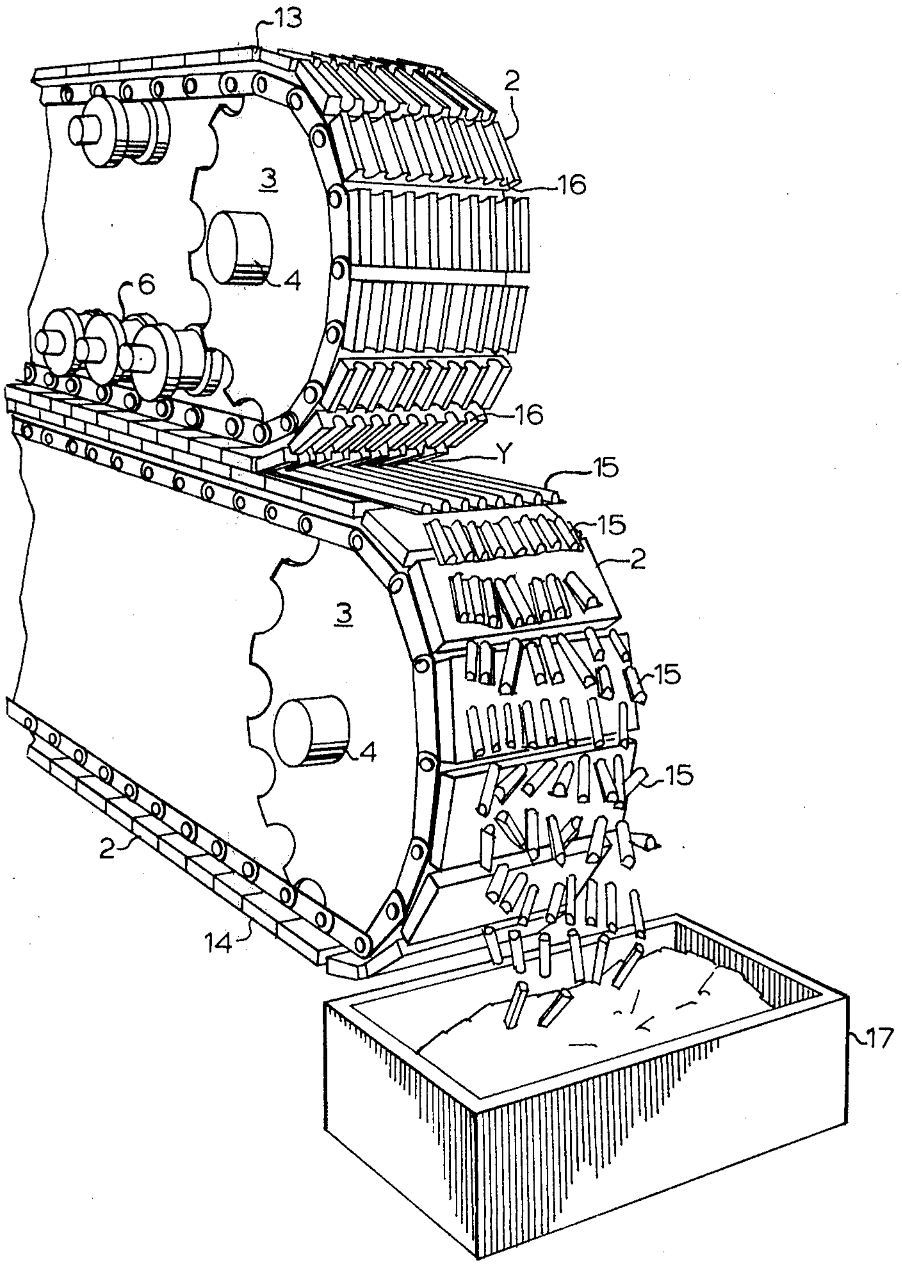
FIG. 6 is an isometric drawing of the discharge portion of the apparatus shown by element 1 of FIG. 1, namely the right-hand portion of FIG. 1.

Referring particularly to FIGS. 1 and 6, the apparatus contemplated by this invention is shown generally by element 1. Element 2 are pads of like construction and, for the sake of this disclosure, may be constructed from a piece of any appropriate metal stock, such pads being linked together in a well-known manner so as to form continuous belts 13 and 14. For the purpose of this disclosure, continuous belt 13 is referred to as the first continuous belt and continuous belt 14 is referred to as the second continuous belt. First continuous belt 13 is driven by drive sprocket 3 mounted on axle 4, and contains in its outer periphery teeth 7. It is also supported by guide roller 8, also mounted on axle 4. The upper-most portion of continuous belt 13 is supported and guided by rollers 6 and the lower-most portion is also supported and guided by rollers 6, of a well-known construction. First continuous belt 13 is rotated in a counterclockwise direction.

Second continuous belt 14 is constructed in a manner similar to that of first continuous belt 13, i.e. a plurality of pads 2 are movably connected one to another. This continuous belt is driven by drive sprocket 3, mounted on axle 4, such sprocket containing teeth 7. As in the case with continuous belt 13, the end portion opposite from drive sprocket 3 is mounted on guide roller 8, which in turn is mounted on axle 4.

Figure 2A:
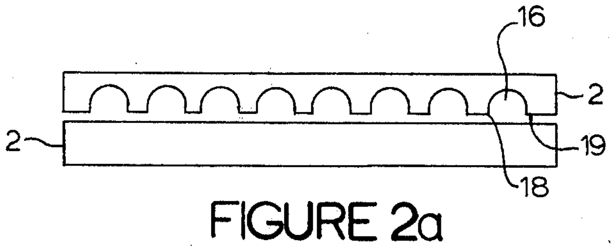
FIGS. 2*a*, 2*b* and 2*c* are side elevations of longitudinally aligned pads shown by element 2 of FIG. 1 of the invention, showing longitudinal grooves in pads 2 of the upper-most belt, longitudinal grooves in pads 2 of the lower-most belt, and longitudinal grooves in pads 2 of both upper and lower belts, respectively.
Figure 3A:
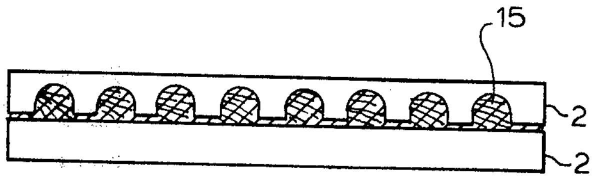
FIGS. 3*a*, 3*b* and 3*c* show the pads 2 of FIGS. 2*a*, 2*b* and 2*c* with their longitudinal grooves full of wood particles.

Referring to FIG. 6, the free surface of pads 2 of first continuous belt 13 are exposed, showing a plurality of longitudinally aligned grooves 16, like those of FIGS. 2*a* and 3*a*. Pads 2 of second continuous belt 14 are of the embodiment shown in FIGS. 2*a* and 3*a*. When the free surface of pads 2 of continuous belt 14 are in mating confronting alignment with the free surface of pads 2 of continuous belt 13, a long continuous die is formed, which runs the full length of continuous belt 13, namely that length between points X and Y of FIG. 1.

Referring to FIG. 1, there is shown chute 9 through which particulate wood material, containing 12 to 20% water, is conveyed from a source (not shown) onto the free surface of pads 2 of continuous belt 14. The wood particulate material is indicated by element 10 and is deposited on the free surface of pads 2 of continuous belt 14 to a depth such that when it is compacted by means 11, more fully described hereinafter, the depth of the thus compacted particulate wood material, shown as element 12 is at least three times and preferably four times the largest cross-section dimension of die 16, namely the distance from elements 18 and 19 shown in FIG. 2*a*. Element 11 is a means for compacting the particulate material 10 and can be any convenient compacting apparatus available, for example, one that uses a vibratory motion to strike the particulate material 10 and compact it to the desired dimension, namely at least three if not four times that of the dimension between elements 18 and 19 of FIG. 2*a*.

Once the particulate material 10 is compacted to the desired depth, as is shown by element 12, it enters the "nip" formed between the converging pads 2 of continuous belt 13 and pads 2 of continuous belt 14.

Applicant has found that for optimum results, second continuous belt 14 should move at a linear speed of at least 90 feet per minute. One of the belts, either continuous belt 13 or continuous belt 14, must move faster than the other. In a preferred embodiment, the second continuous belt is moved at a speed of no less than 90 feet per minute and the length of first continuous belt 13 is such that the particulate wood material is exposed to the grooves of the first continuous belt for at least 5 seconds. The linear speed of the continuous belt is faster than the second continuous belt and must be such that the heat generated by the friction of this differential movement heats the wood particles to a temperature between 180° F. and a temperature below the ignition temperature of the particulate material itself. Preferably, the particulate wood material 12 is heated by a means (not shown) to roughly 180° F. prior to it being placed on pads 2 of continuous belt 14. Such a temperature is below that which actuates the natural resins and/or pitch of the wood. As a general rule, the length of continuous belt 14 is longer than the length of continuous belt 13.

Figure 2B:
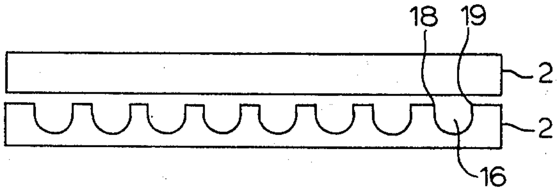
Figure 2C:
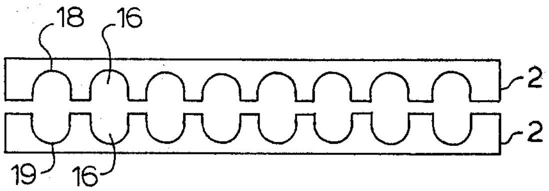

Referring to FIGS. 2*a*, 2*b* and 2*c*, such figures show three different embodiments of pad 2 configurations that may be used to form the die or dies of the instant invention. Element 16 refers to the longitudinally aligned grooves and points 18 and 19 refer to the longest cross-sectional dimension of the respective grooves. The grooves themselves can be in the free surface of the pads of continous belt 13 (FIG. 2*a*) or in the free surface of pads 2 of both continuous belt 13 and continuous belt 14, as shown by FIG. 2*c*. In the case of the embodiment of FIG. 2*c*, the largest cross-sectional dimension is between points 18 and 19. It would be this dimension that would govern the dimension (thickness) of the particulate material layed down and shown as element 12 in FIG. 1.

Figure 3B:
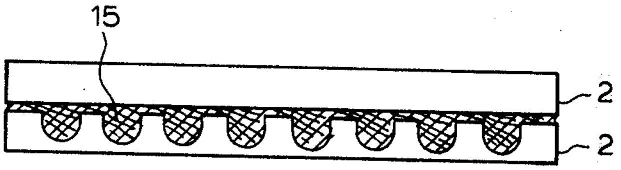
Figure 3C:
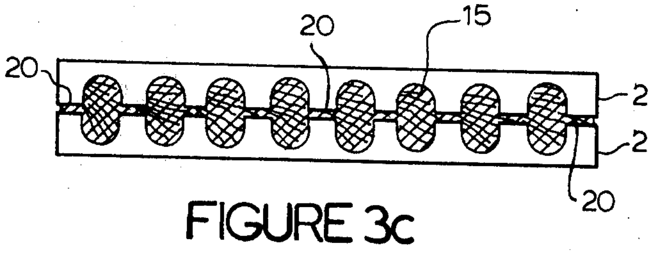

FIGS. 3*a*, 3*b* and 3*c* show pads 2 of FIGS. 2*a*, 2*b* and 2*c*, respectively, filled with wood particulate material formed in pellet form, shown as element 15 in FIG. 1.

Figure 4A:
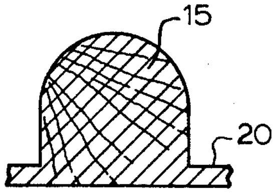
FIGS. 4*a*, 4*b* and 4*c* are side elevations of wood pellets formed by the pads shown in FIGS. 2*a*, 2*b* and 2*c* and also shown in FIGS. 3*a*, 3*b* and 3*c*, respectively.
Figure 4B:
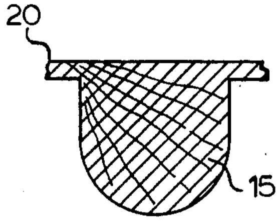
Figure 4C:
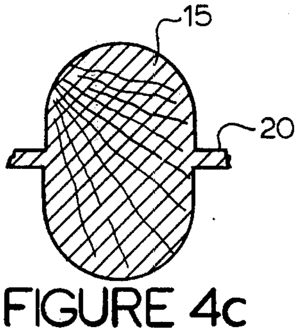
Figure 5A:
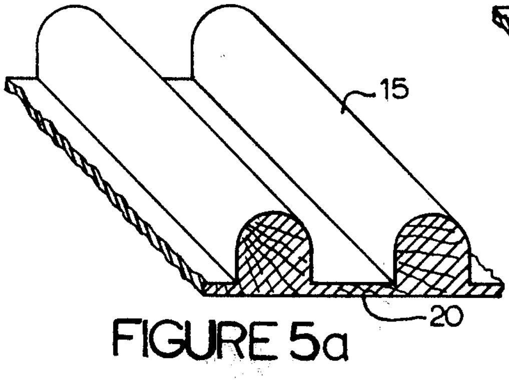
FIGS. 5*a*, 5*b* and 5*c* are isometric representations of the wood pellets formed by the dies shown in FIGS. 3*a*, 3*b* and 3*c*, respectively.
Figure 5B:
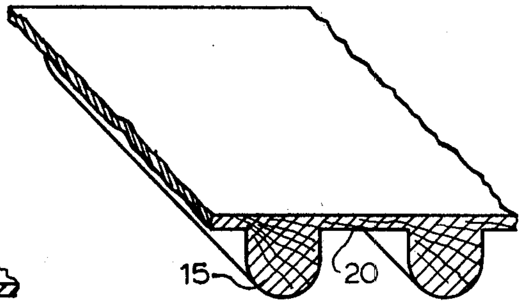
Figure 5C:
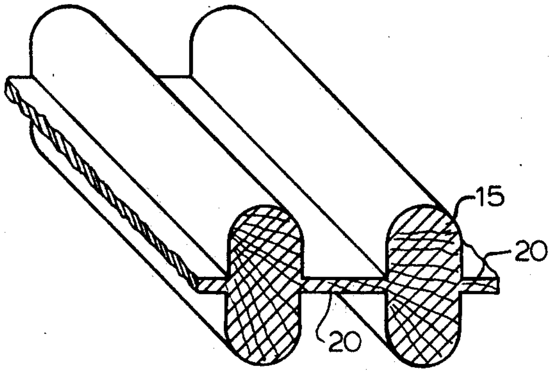

FIGS. 4*a*, 4*b* and 4*c* show cross-sections of wood pellets formed by FIGS. 2*a*, 2*b* and 2*c*, as well as FIGS. 3*a*, 3*b* and 3*c*, respectively. It has been found that wood particulate material fed into the "nip" between pads 2 of continuous belt 13 and 14 does not always flow or confine itself to the dies formed by the pads. On occasion there are flanges or tabs 20 formed, as shown in FIGS. 4*a*, 4*b* and 4*c*. Such flanges or tabs are also shown in FIGS. 5*a*, 5*b* and 5*c*, which are isometric drawings of the wood pellets as they emerge from the apparatus shown in FIGS. 1 and 6.

Referring to FIGS. 1 and 6, the wood particulate material 12 enters any one of the die configurations contemplated by FIGS. 2*a*, 2*b* and 2*c* by the counterclockwise motion of continuous belt 13 and the clockwise motion of continuous belt 14, the rotation of one of the continuous belts, either continuous belt 13 or continuous belt 14, faster than the other belt, rotating one of the belts at preferably 90 feet per minute and the other belt rotated in such a manner that a temperature in excess of 180° F. and below the ignition temperature of the wood particulate material is achieved, wood particulate material 12 is extruded, cut, shredded, compacted and cohered one to another from point X to point Y, point Y being essentially the exit point of the pellets emerging from the apparatus as shown in FIG. 6. It will be noted that continuous belt 14 is shown longer than continuous belt 13 so as to provide an "overhang" in the wood entrance portion as well as in the wood particle exit portion. At the entrance portion, such an overhand provides room for chute 9, compactor 11. At the exit portion a slight overhang is provided, enough to carry the compacted particulate beyond the exit point Y and allow it to transversely break and fall into container 17.

Figure 7:
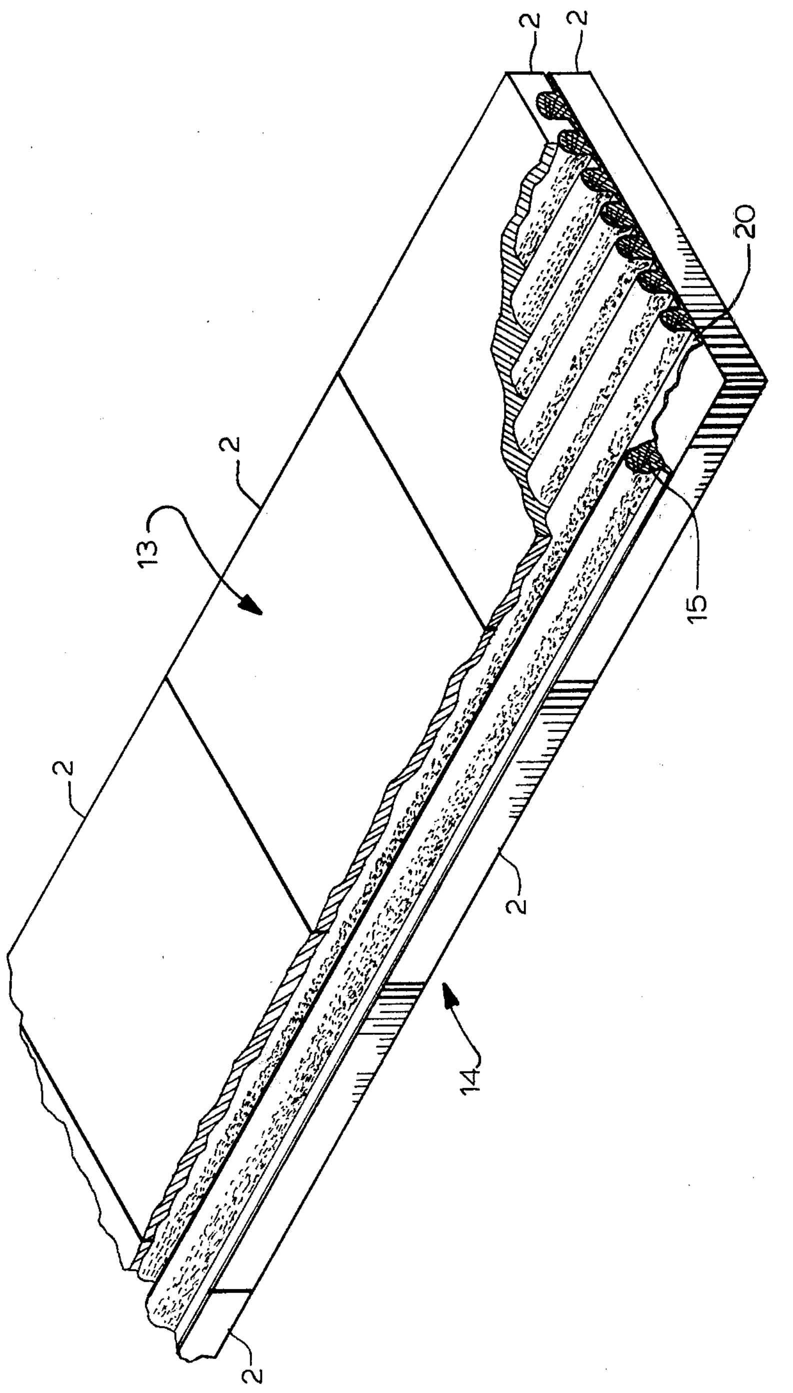
FIG. 7 is an isometric fragmentary cut-a-way portion of a plurality of confronting aligned pads 2 of FIGS. 1 and 6, showing wood pellets formed in the grooves of the pads in the upper or first continuous belt using the die formation of co-mating pads of FIG. 2*a*.

Referring particularly to FIG. 7, there is shown a portion of continuous belt 13 in confronting mating alignment with continuous belt 14 with a portion of pads 2, forming continuous belt 13, being cut away to expose a die and wood particle forming embodiment like that of FIGS. 2*a*, 3*a*, 4*a* and 5*a*. It is to be understood that whatever die configuration is used, e.g., embodiments shown in FIGS. 2*a* through 3*c* all are operable as long as the basic teachings relating to continuous belt travel and the relative speed of one with respect to the other is maintained as previously described.

Although the present invention has been disclosed in connection with the few preferred embodiments thereof, variations and modifications may be resulted by those skilled in the art without departing from the principles of this invention. All of these variations and modifications are considered to be well within the true spirit and scope of the present invention and disclosed in the foregoing description and defined by the appended claims.

I claim:

1. A method of forming pellets from wood particulate matter comprising:

(a) providing a supply of particulate wood matter having a water content between 12 and 20 percent;

(b) providing an extrusion means adapted to continuously extrude such wood particulate matter through one or more elongated dies composed of first and second continuous mating belts comprised of a plurality of pads having a free surface, each of the pads of at least one of said belts containing one or more longitudinal grooves in its free surface and the free surface of the pads of the other continuous belt being confrontingly aligned with the free surface of the pads containing the groove or grooves, to form one or more elongated dies;

(c) feeding the wood particulate matter into such die or dies and thereafter;

(d) compacting, extruding and autogenously heating the wood particles in the one or more elongated die or dies by simultaneously rotating the first belt counterclockwise and the second belt clockwise at respective rotational speeds such that the linear speed of said first is greater than the linear speed of the second belt, thereby creating heat from friction generated between said wood particles and said dies; and, (e) breaking the compacted wood particles formed by step (d) into pellets.

2. The method as described in claim 1 wherein the length of the second belt is greater than the first.

3. The method as described in claim 1 wherein the pads of the second mentioned belt contains one or more longitudinal grooves in its free surface.

4. The method as described in claim 1 wherein the wood particulate material is heated to an entrance temperature above 180° F. prior to its being fed into the die or dies.

5. A method as described in claim 1 wherein the heat autogenously created by the two belts heats the wood particles to a temperature between 180° F. and a temperature below the ignition temperature of the particulate matter.

6. A method as described in claim 1 wherein the wood particulate material is placed on the second belt prior to it coming in contact with the first belt at depth of no less than three times the greatest cross-sectional dimension of an individual die.

7. A method as set forth in claim 6 wherein the wood particulate matter placed on the second belt is compacted prior to its coming into contact with the first belt to a depth of no less than three times the greatest cross-sectional dimension of an individual die.

8. A method as described in claim 1 wherein the linear speed of the second belt is no less than 90 feet per minute.

9. A method as set forth in claim 8 wherein the length of the first belt is such that the particulate wood material is exposed to the pads of the first belt at least 5 seconds.

* * * * *